F. HORNBY.
MOTOR FOR STRUCTURAL TOYS.
APPLICATION FILED FEB. 3, 1913.
1,196,238.
Patented Aug. 29, 1916.
4 SHEETS—SHEET 2.
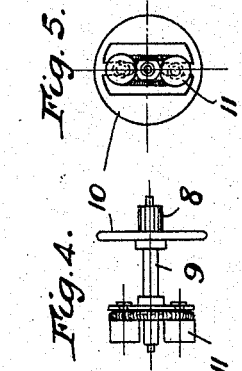
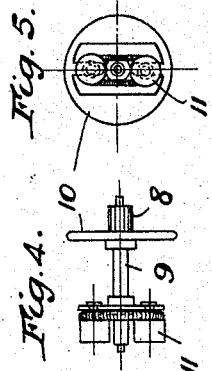
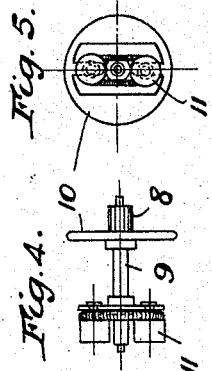
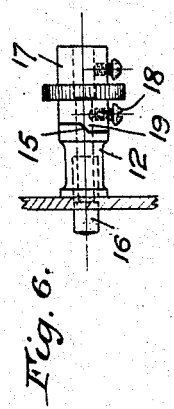
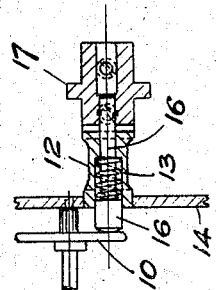
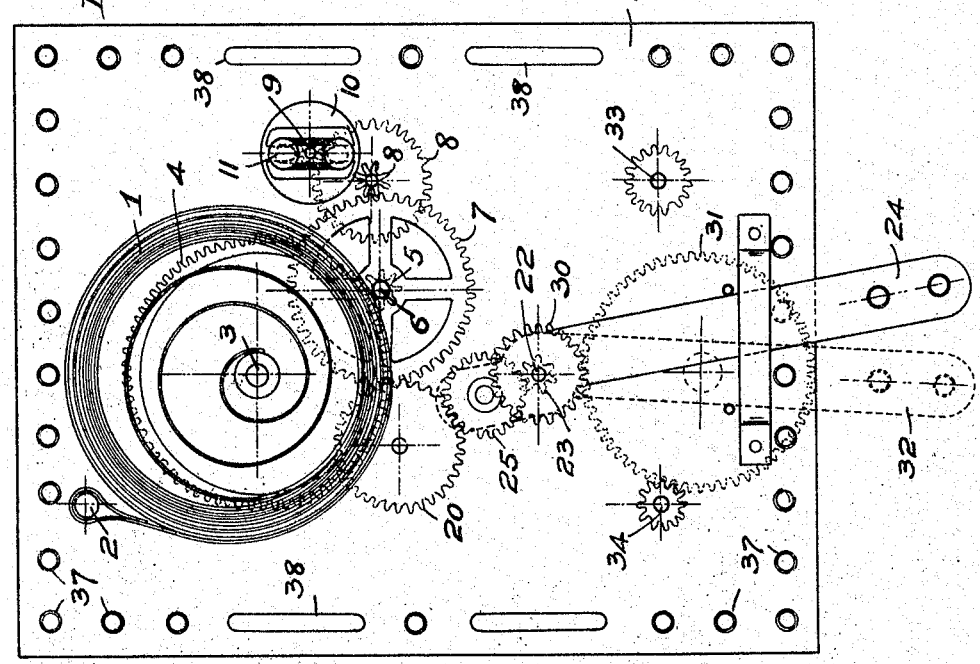
WITTNESSES
INVENTOR
Frank Hornby
Percy H Moore
attorney F. HORNBY.
MOTOR FOR STRUCTURAL TOYS.
APPLICATION FILED FEB. 3, 1913.
1,196,238.
Patented Aug. 29, 1916.
4 SHEETS—SHEET 3.
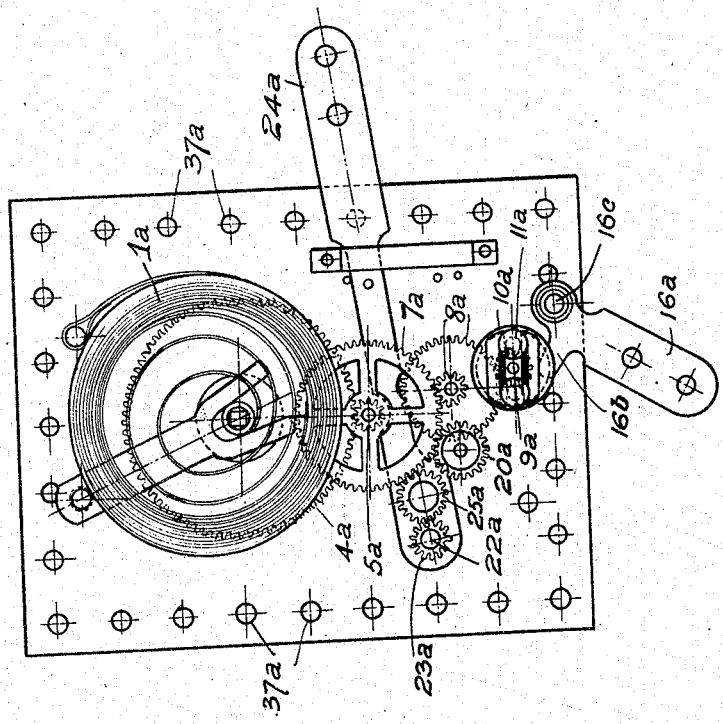
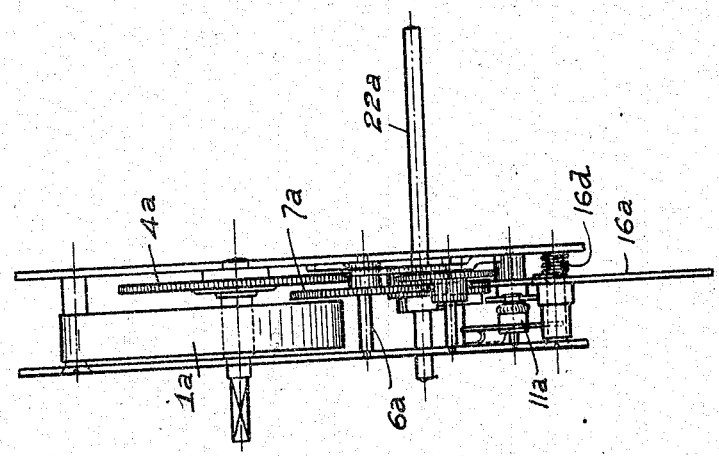

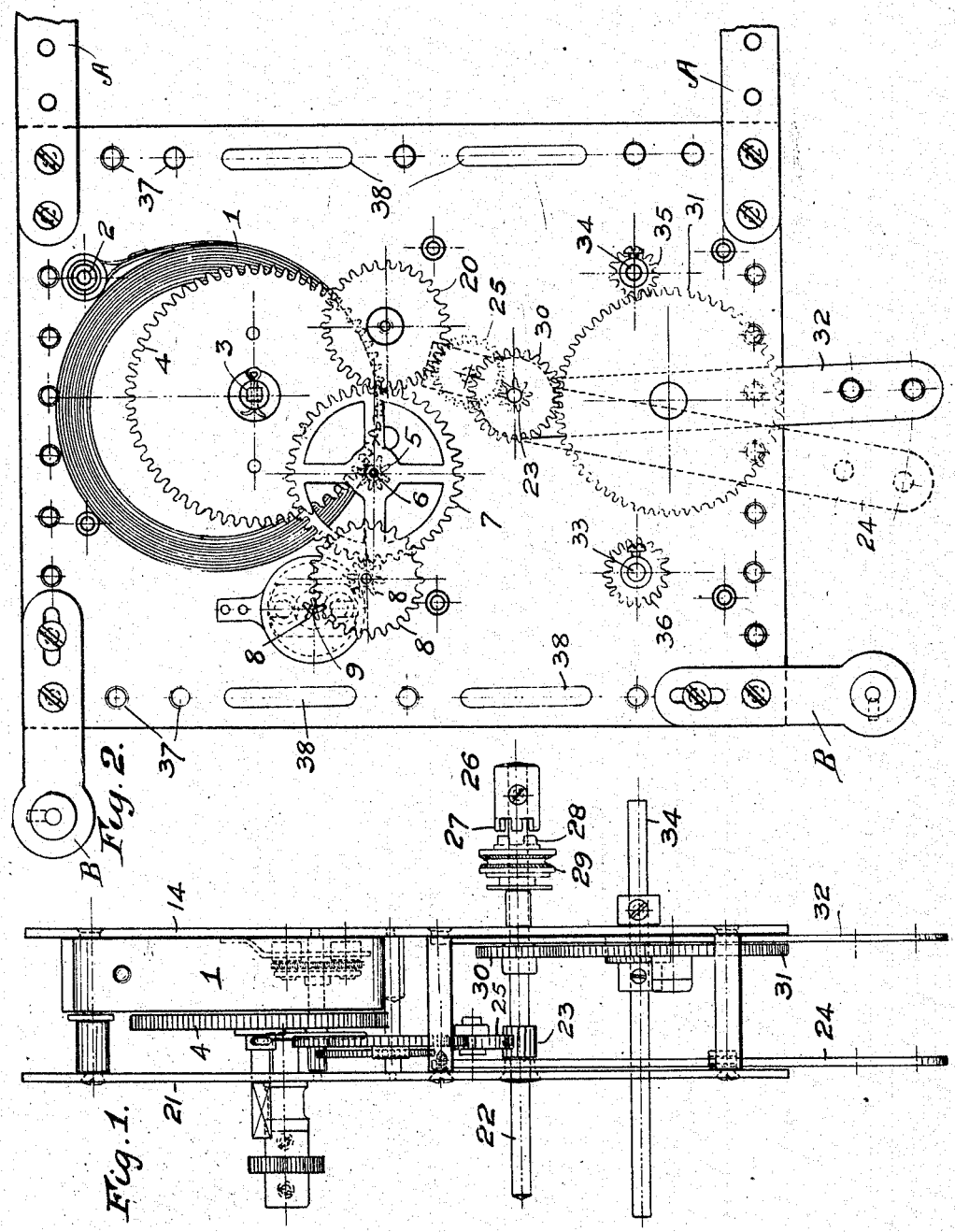

F. HORNBY.
MOTOR FOR STRUCTURAL TOYS.
APPLICATION FILED FEB. 3, 1913.
1,196,238.
Patented Aug. 29, 1916.
4 SHEETS—SHEET 4.
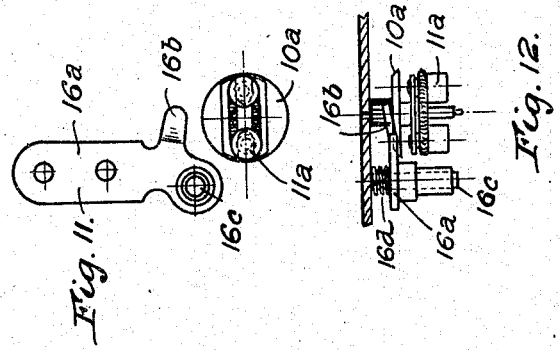
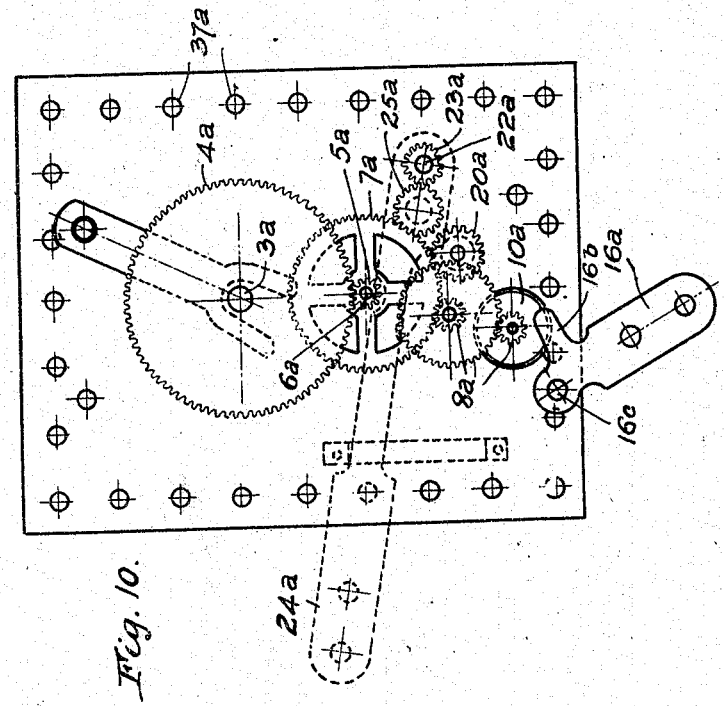
WITTNESSES
INVENTOR
Frank Hornby
attorney

UNITED STATES PATENT OFFICE.

FRANK HORNBY, OF LIVERPOOL, ENGLAND, ASSIGNOR TO MECCANO LIMITED, OF LIVERPOOL, ENGLAND, A CORPORATION OF GREAT BRITAIN.

MOTOR FOR STRUCTURAL TOYS.

1,196,238.       Specification of Letters Patent.      Patented Aug. 29, 1916.

Application filed February 3, 1913. Serial No. 745,928.

*To all whom it may concern:*

Be it known that I, FRANK HORNBY, a subject of the King of Great Britain, and a resident of Liverpool, England, have invented certain new and useful Improvements in Motors for Structural Toys, of which the following is a specification.

The invention relates to small working models made up from standard parts comprising perforated strips and plates connected by bolts and nuts, the perforations besides being available for bolting the parts together acting also as bearings for the reception of shafting to carry pulleys or gear wheels. For such models a simple and efficient type of spring motor is frequently required for building into the model for the purpose of driving the working parts thereof. Such a motor should have a powerful spring drive, a brake mechanism, and a reversing gear, and should also be of such a nature that it may be detachably connected to the standard parts from which the model is built up, and be capable of being easily and adjustably coupled by means of its driven shaft to the rotating elements, or the like, of the model.

According to the present invention, a simple type of spring motor driving through a clockwork train is provided having the above advantages, the gear train being mounted within side plates perforated around their edges with holes pitched at equal distances apart. Such an arrangement enables the side plates to be easily and detachably connected by means of bolts and nuts to the perforated strips or plates as used in the construction of models on the system referred to above. In place of providing the edges of the plates with a continuous series of holes, slots may be formed in the edges corresponding in width to the holes and of such length as to extend throughout one or more pitch lengths of the holes. These slots provide for adjustability in the connection of the motor side plates to the model, where the usual pitched holes would not be in correct position.

The invention is illustrated in the accompanying drawings, in which,

Figure 1. is an edge view of a motor constructed in accordance with this invention, Fig. 2. being a face view of the motor looked at from the left side of Fig. 1. and having the left side plate, as seen in that figure, removed for clearness. Fig. 3. is a view analogous to Fig. 2. but looked at from the right of Fig. 1., the right side plate as seen in that figure being removed. Figs. 4. and 5. are end and face views respectively, of the brake disk and governor. Fig. 6. is a fragmentary detail view of the brake control button, Fig. 7. being a complete view in section of the brake gear. Figs. 8. to 12. show a modification of the motor, Fig. 8. being an edge view, Fig. 9. a face view with the left side plate of Fig. 8. removed, and Fig. 10. a face view with the right side plate of Fig. 8. removed. Fig. 11. is an elevation, and Fig. 12. an end detail of the brake and governor mechanism of this modification.

In Fig. 3. certain of the gear wheels and in Fig. 10. the reversing lever are shown dotted for the purpose of facilitating the reading of the drawing.

The spring 1 of the usual volute type is connected to a fixed pin 2 and the spindle 3 of a primary spur wheel 4, which engages and drives a pinion 5 on the secondary arbor 6. On the arbor 6 is a gear wheel 7 driving a gear train 8 on the last spindle 9 of which is a brake disk 10. This spindle 9 also carries a governor 11 of any suitable and usual type. The brake disk 10 is adapted to be frictionally engaged by a spring controlled pin 16, and the stopping or starting of the motor thus readily effected. The pin barrel 12, Figs. 6. and 7., containing a spring 13, is fixed in one of the side plates 14 and is provided with cam faces 15. The pin 16 is normally pressed into engagement with the disk 10 by the spring, and the outer end of the pin is fitted with a milled turn-button 17 within which the pin may be gripped by the set screw 18, whereby its axial projection from the turn-button may be adjusted and the compression of the pin foot against the disk 10 regulated. The turn-button 17 is provided with cam faces 19 similar to, and adapted to engage, those on the spring barrel, the cam faces on the spring casing and on the turn button forming alternate raised steps and recesses which fit together when in the position shown in Fig. 6., and allow the foot of the pin 16 to be pressed by the spring into engagement with the brake disk 10. If the button be turned in either direction from the position shown in Fig. 6., the cam faces on the button ride up those on the fixed spring barrel, causing the button to be moved back axially, and the pin to be retracted against the compression of the spring, thus relieving the frictional pressure of the pin on the brake disk. By rotating the button until the oblique cam faces completely pass each other, and the flat tops of the raised steps engage together, the compression in the spring holds the button locked permanently in such off position, while only a slight rotary movement of the button is required, when the brake is to be released temporarily. Reversed rotation of the button resets the brake. The gearwheel 7 permanently meshes with another gearwheel or pinion 20, independent of the gear train. Mounted upon the permanent driving spindle 22 in the side plates 14, 21, at some little distance from the teeth of the gearwheels 7 and 20 is another pinion 23. The spindle 22 of this pinion forms, or coincides axially with, the pivot of a reversing lever 24, and pivotally carried on this lever so as to lie in the curved angle formed by the adjacent teeth of the gearwheels 7 and 20 is a fourth pinion 25. The position of the wheels 7, 20, and 23, being fixed, and the pinion 25 being pivoted on the lever 24, movement of the lever to one or other side will cause engagement of the pinion 25 with either of the gearwheels 7 or 20 and as the pinions 25 and 23 are mounted on the lever so as to be always in mesh, the direction of rotation of the pinion 23 will be reversed according as to whether the pinion 25 is in engagement with the gearwheels 7 or 20. In this way the direction of rotation of the driving spindle 22 may be altered by operating the lever 24. On the driving spindle 22 is fixed a dog clutch element 26, the teeth 27 of which are adapted to engage with clutch teeth 28 on a grooved driving pulley 29 which is slidable axially on the driving spindle 22 to engage or disengage the clutch. Another gearwheel 30 may be fixed on the spindle 22 adapted to engage a large gearwheel 31 pivotally carried on a second lever 32, the lever 32 oscillating about the spindle 22 in such manner that the gearwheels 30 and 31 are always in mesh. Perforations may be formed in both side plates 14 and 21 on either side of the travel of the large gearwheel 31, and auxiliary driving spindles 33, 34, may be detachably fitted in these perforations, to which spindles are secured gear pinions 35, 36, with either one of which the large gearwheel 31 is adapted to be engaged by operating the lever 32. In this way by moving the lever 32 to one side or the other the gearwheel 31 may be caused to drive either of the spindles 33, 34, and the rotary direction of each spindle varied according to the position of the reversing lever 24.

A locking mechanism may be provided on the second lever, this locking mechanism consisting of a pin head or the like projection on the lever riding past two or more perforations in the side plate, the lever being so resiliently mounted with reference to the perforations that the projection on the lever will engage the perforations and spring therein. The side plates 14 and 21 are perforated along all four edges at 37, the perforations being pitched at equal distances apart whereby the motor may be connected to the standard perforated parts in connection with which the apparatus is adapted to be used, and at suitable positions in the edge of the side plates slots 38 may be formed extending throughout one or more pitch lengths of the perforations 37, such slots providing for adjustability in connecting the motor plates to the other parts of the model, where correctly pitched holes would not come exactly in position. The holes for the spindles 33, 34, are also made at distances from the outer perforations 37 corresponding to even multiples of the pitch lengths of the perforations 37, the extended spindles 34, 35, being utilized for driving the moving parts of the models.

In Fig. 2, there are shown elements A—A and B—B, illustrating one way in which elements having perforations spaced to a standardization can be connected with one of the plates of the motor by means of the similarly spaced perforations therein.

In the modification shown in Figs. 8. to 12. the spring $1^a$ drives the spindle $3^a$ of the primary spur wheel $4^a$, which drives a pinion $5^a$ on the secondary arbor $6^a$ as before, the gearwheel $7^a$ driving a gear train $8^a$ on the last spindle $9^a$ of which is the brake disk $10^a$, and a governor $11^a$. The brake disk $10^a$ is adapted to be frictionally engaged by a cam lip $16^b$ on a lever $16^a$, pivoted at $16^c$ and pressed outwardly by a spring $16^d$. As the lever $16^a$ is thrown over, the lip $16^b$ engages the disk $10^a$ compressing the spring $16^d$, and the gear train may thus be started or stopped. The gearwheel $7^a$ permanently meshes with a pinion $20^a$ independent of the gear train, another pinion $23^a$ being mounted some distance from the gear wheels $7^a$, $20^a$, upon a driving spindle $22^a$ which forms the pivot of the reversing lever $24^a$. A pinon $25^a$ carried on the lever $24^a$ and permanently in mesh with the pinion $23^a$ is adapted to be meshed with either of the gears $7^a$, $20^a$, and the direction of rotation of the spindle $22^a$ varied. The spindle $22^a$ is extended, as shown in Fig. 8., and by fitting gear wheels thereon may be utilized for driving the models in which the motors are built up. The edges of the side plates of the motor are perforated with a series of equally pitched holes $37^a$, as previously described.

I claim:—

1. In a building model, toy or the like employing differing elements having similar regularly spaced perforations, the combination of a plate having perforations adapted by their spacing to register in any of a variety of ways with the perforations of said elements, a second plate connected with the first to form a unitary structure, and a motor mechanism mounted between said plates.

2. In a building model, toy or the like employing differing elements having similar regularly spaced perforations, the combination of a unitary structure comprising a pair of plates having perforations adapted by their spacing to register in any of a variety of ways with the perforations of said elements and a motor mechanism carried by said plates.

3. In a building model, toy or the like employing differing elements having similar regularly spaced perforations, the combination of a unitary structure comprising a pair of plates having perforations adapted by their spacing to register in any of a variety of ways with the perforations of said elements and a motor mechanism mounted between said plates.

4. In a building model, toy or the like employing perforated elements, the combination of a pair of plates having perforations adapted to register with those of said elements, a driving shaft projecting through one of said plates, a motor mounted between said plates, a train of gearing between said motor and shaft, means for reversing the direction of rotation of said shaft, and a brake associated with said gearing.

5. In a building model, toy or the like employing perforated elements, the combination of a pair of plates having perforations adapted to register with those of said elements, a driving shaft projecting through one of said plates, a spring motor mounted between said plates, a train of gearing between said motor and shaft, means for reversing the direction of rotation of said shaft, and a friction brake associated with said gearing.

6. In a building model, toy or the like employing perforated elements, the combination of a pair of plates having perforations adapted to register with those of said elements, a driving shaft projecting through one of said plates, a motor mounted between said plates, a train of gearing between said motor and shaft, a reversing lever mounted on said shaft and carrying part of said train of gearing, and a brake associated with said gearing.

7. In a building model, toy or the like employing perforated elements, the combination of a pair of plates having perforations adapted to register with those of said elements, a driving shaft projecting through one of said plates, a motor mounted between said plates, a train of gearing between said motor and shaft, means for reversing the direction of rotation of said shaft, a brake disk geared to said motor, and means cooperating therewith to stop the rotation of said disk.

8. In a building model, toy or the like employing perforated elements, the combination of a pair of plates having perforations adapted to register with those of said elements, a driving shaft projecting through one of said plates, a motor mounted between said plates, a train of gearing between said motor and shaft, means for reversing the direction of rotation of said shaft, two auxiliary shafts, means whereby motion is imparted to either of said auxiliary shafts through said driving shaft, and a brake associated with said gearing.

9. In a building model, toy or the like employing perforated elements, the combination of a pair of plates having perforations adapted to register with those of said elements, a driving shaft projecting through one of said plates, a motor mounted between said plates, a train of gearing between said motor and shaft, means for reversing the direction of rotation of said shaft, an auxiliary shaft, a lever pivoted on said driving shaft, a gear mounted thereon, a pinion mounted on said driving shaft and meshing with said gear, and a pinion mounted on said auxiliary shaft with which said gear is adapted to mesh.

10. In a building model, toy or the like employing perforated elements, the combination of a pair of plates having perforations adapted to register with those of said elements, a driving shaft projecting through one of said plates, a motor mounted between said plates, a train of gearing between said motor and shaft, means for reversing the direction of rotation of said shaft, an auxiliary shaft, a lever pivoted on said driving shaft, a gear mounted thereon, a pinion mounted on said driving shaft and meshing with said gear, a pinion mounted on said auxiliary shaft with which said gear is adapted to mesh, and a brake associated with said train of gearing.

11. In a building model, toy or the like employing differing elements having similar uniformly spaced perforations, the combination of a unitary structure comprising a plate having perforations adapted by their spacing to register in any of a variety of ways with the perforations of said elements, a motor mechanism carried by said plate, and a shaft driven by the motor mechanism and projecting through the plate, the perforation for the reception of the shaft being spaced from the other perforations in the said plate at distances which are multiples of the distances between the said other perforations.

12. In a building model, toy or the like employing differing elements having similar uniformly spaced perforations, the combination of a unitary structure comprising a pair of plates having perforations adapted by their spacing to register in any of a variety of ways with the perforations of said elements, a motor mechanism carried by said plates, and a shaft driven by the motor mechanism and projecting through the plates, the perforations for the reception of the shaft being spaced from the other perforations in the said plate at distances which are multiples of the distances between the said other perforations.

13. In a building model, toy or the like employing perforated elements, the combination of a pair of plates having perforations adapted to register with those of said elements, a motor mounted between said plates, a shaft driven by said motor and projecting through one of said plates, a counter shaft projecting through perforations in said plates, and gearing connections between said shaft and counter shaft, the perforations for the reception of said counter shaft being uniformly spaced with respect to the other perforations in said plates and elements.

14. In a building model, toy or the like employing perforated elements, the combination of a pair of plates having perforations adapted to register with those of said elements, a motor mounted between said plates, a shaft driven by said motor and projecting through one of said plates, a plurality of counter shafts projecting through perforations in said plates, and gearing to connect said shaft and counter shafts, the perforations for the reception of said counter shafts being uniformly spaced with respect to the other perforations in said plates and elements.

15. The combination in a working model, toy or the like, of differing elements having therein perforations spaced to a standardization common to said elements, and a motor having in its structure perforations also spaced to the aforesaid standardization and adapted thereby to register with perforations in the elements in securing the motor thereto.

16. The combination in a working model, toy or the like, of differing elements having therein perforations spaced to a standardization common to said elements, and a motor including in its structure a plate having therein a succession of perforations also spaced to the aforesaid standardization and adapted thereby to register with perforations in the elements in securing the motor thereto.

In testimony whereof I affix my signature.

FRANK HORNBY.

Witnesses:
A. J. DAVIES,
H. WATSON.